Oct. 11, 1966  J. B. ROES  3,277,827
POWER CONVERSION SYSTEM
Filed Oct. 13, 1961  5 Sheets-Sheet 1
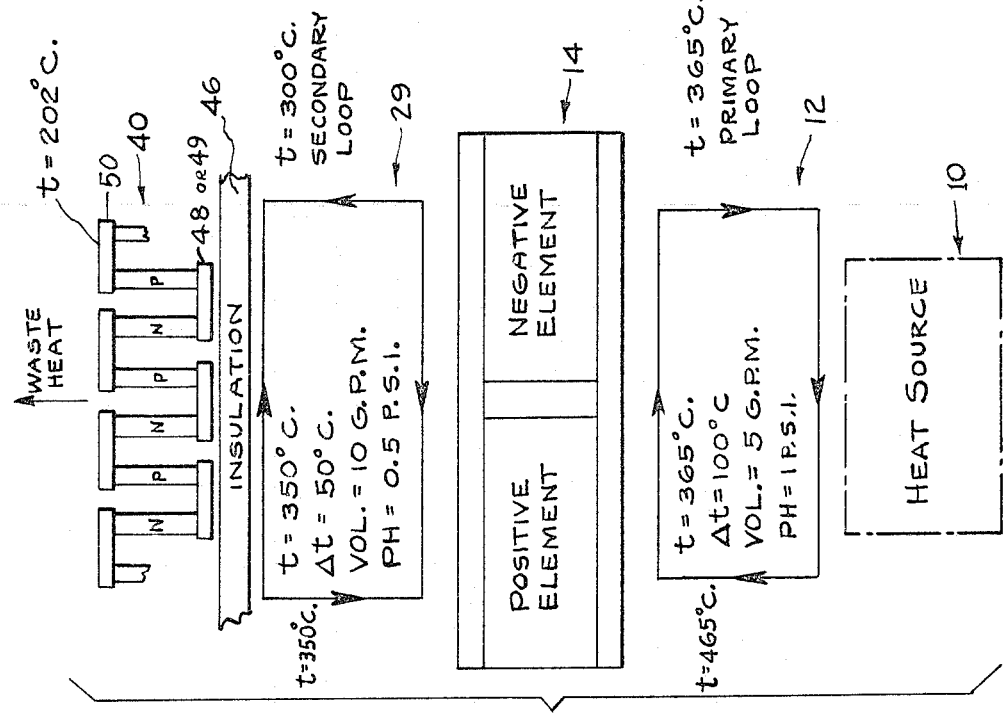
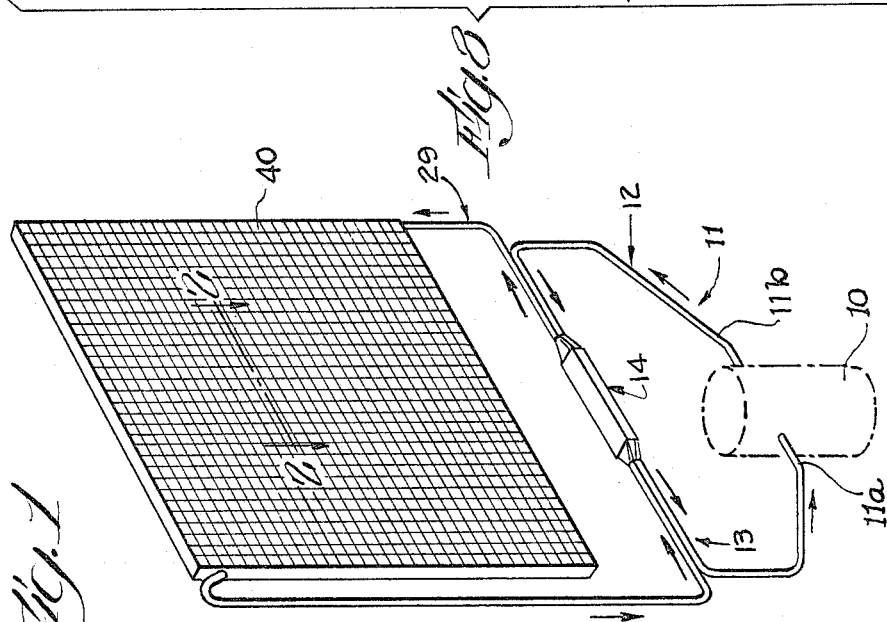
Inventor:
John B. Roes
By Soans, Anderson, Luedeka & Fitch
Attys Oct. 11, 1966  J. B. ROES  3,277,827
POWER CONVERSION SYSTEM
Filed Oct. 13, 1961  3 Sheets-Sheet 2
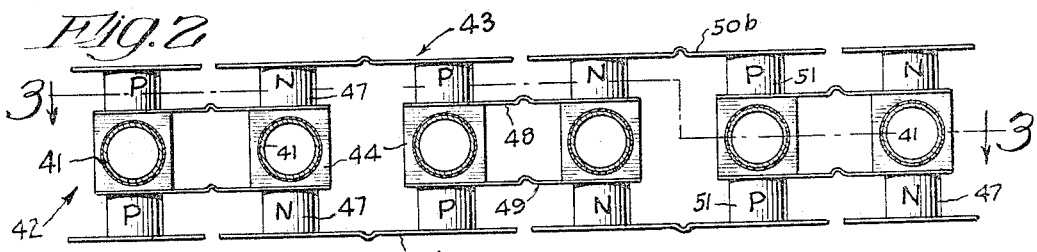
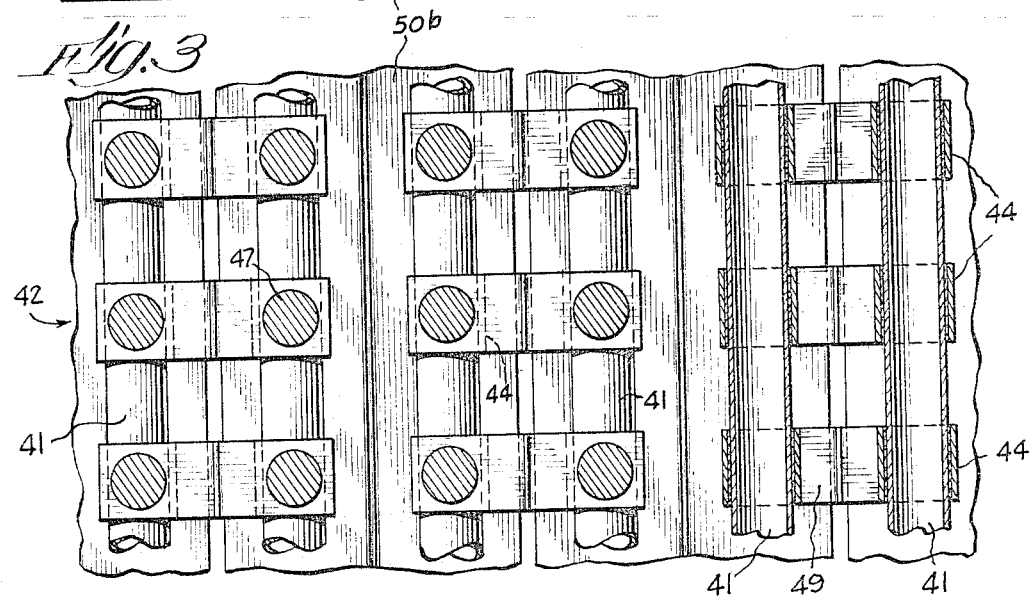
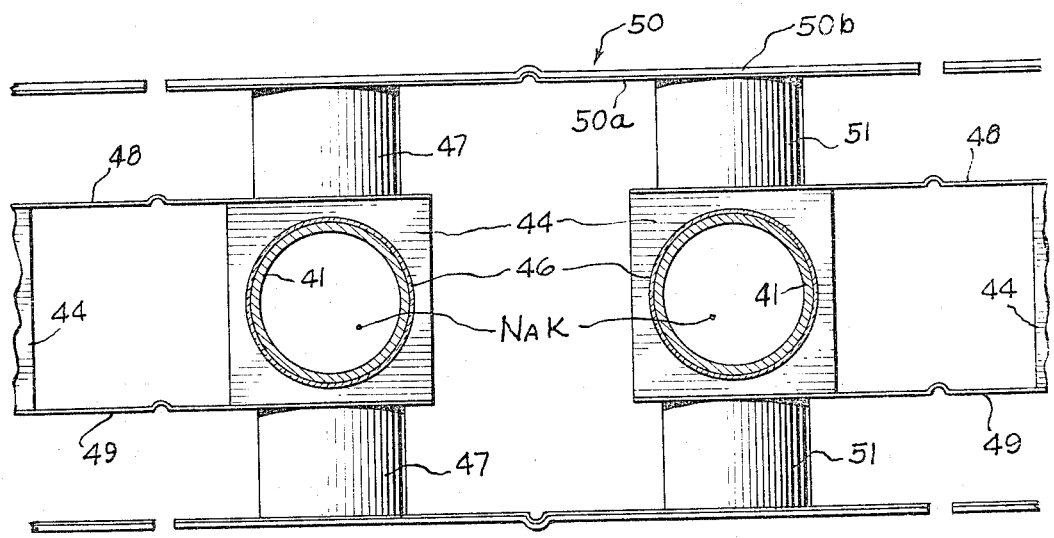
Inventor:
John B. Roes
By Soans, Anderson, Luedeka & Fitch
Attys Oct. 11, 1966   J. B. ROES   3,277,827
POWER CONVERSION SYSTEM
Filed Oct. 13, 1961   3 Sheets-Sheet 3
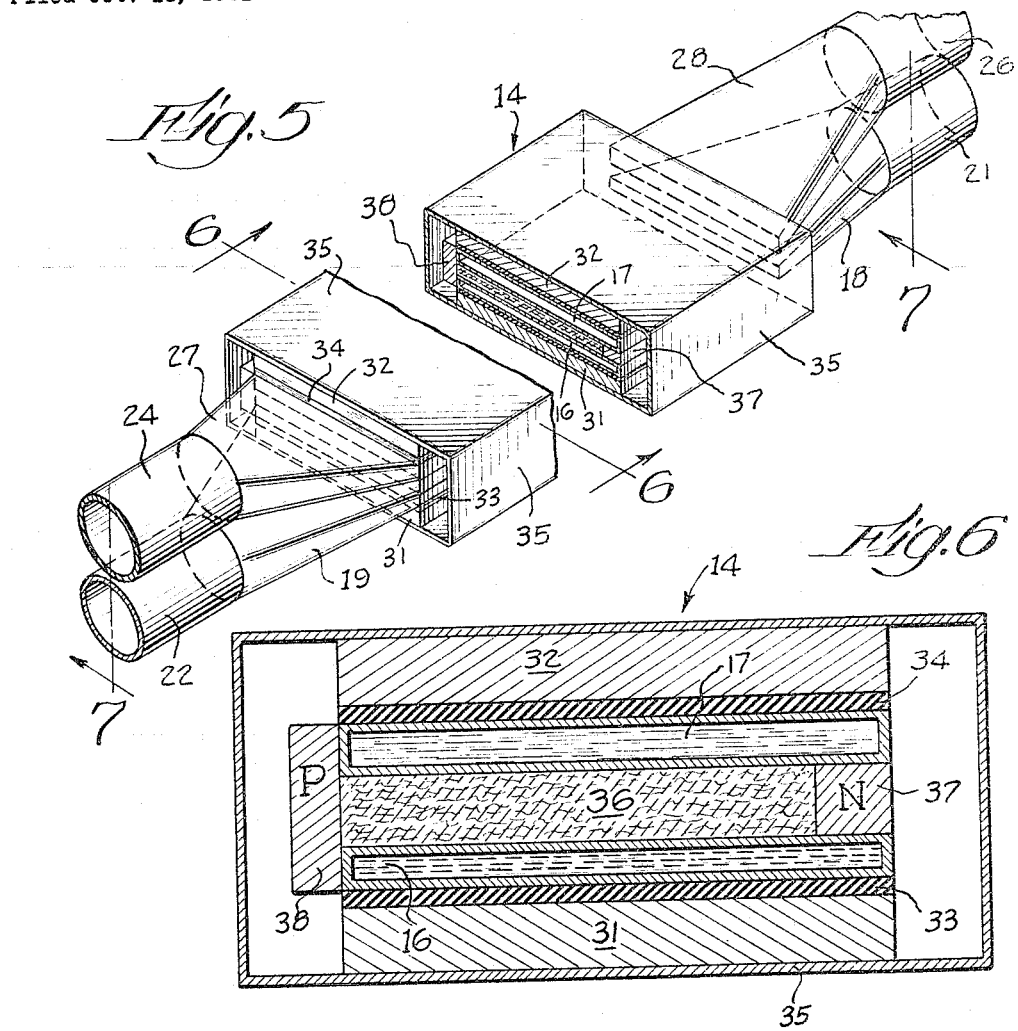
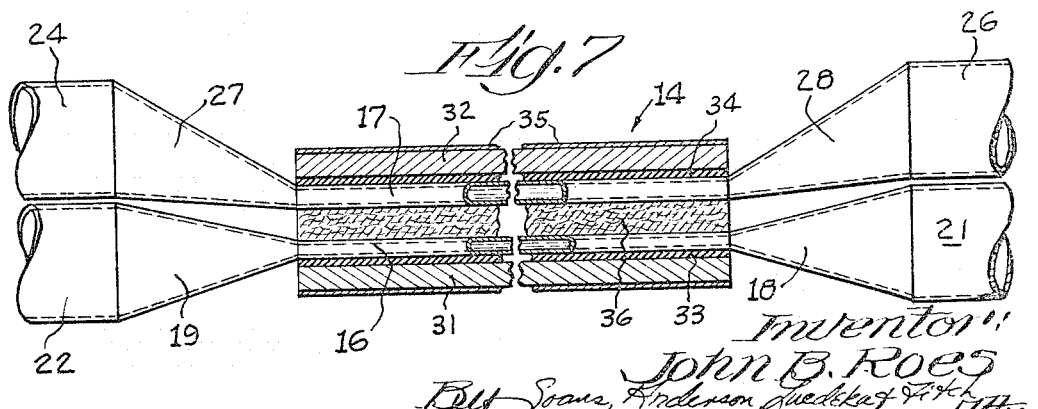
Inventor
John B. Roes
By Soans, Anderson, Luedeka & Fitch
Attys.

United States Patent Office 3,277,827
Patented Oct. 11, 1966

3,277,827
POWER CONVERSION SYSTEM
John B. Roes, San Diego, Calif., assignor to General Dynamics Corporation, New York, N.Y., a corporation of Delaware
Filed Oct. 13, 1961, Ser. No. 144,950
3 Claims. (Cl. 103—1)

This invention relates to power conversion systems and more particularly to an integrated thermoelectric power conversion system and the component parts thereof which render the system particularly suitable for space applications.

Recent advances in space technology have initiated the development of various space power systems. Primary emphasis has been placed on providing a system which is characterized by long life, high reliability, compatibility with space environment, and inherently stable operation. Because of weight limitations, such systems are most feasibly powered by energy derived from solar, nuclear or other sources of thermal energy. For example, systems have been designed wherein a nuclear reactor is utilized as the heat source and a thermoelectric generator is utilized in conjunction therewith to effect the continuous direct conversion of heat to electrical energy so that the need for energy storage devices is eliminated. A system of this type which utilizes a nuclear reactor as the heat source has an advantage over a solar power system in that it can be freely orbited without regard for the orientation of the vehicle relative to the sun during flight.

One major difficulty which has not been overcome by previously designed systems utilizing a reactor as the heat source, is the incompatibility of optimum reactor operating temperatures with the moderate temperature limits of presently available thermoelectric generators which are preferably utilized in conjunction therewith. Accordingly, the need has arisen for an integrated power conversion system, which preferably includes a nuclear reactor as the source of thermal energy and a thermoelectric generator, wherein optimum operating conditions for both the reactor and the thermoelectric generator can be realized and maintained.

It is a prime object of the present invention to provide a thermoelectric power conversion system suitable for use in space applications.

Another object of the present invention is to provide an integrated power conversion system including a thermoelectric generator which can be adapted for use with a nuclear reactor or other suitable source of thermal energy so that optimum operating temperatures for each unit can be maintained.

A further object of the present invention is to provide a thermoelectric power conversion system which is characterized by simplicity of construction and high reliability of operation.

An additional object of the present invention resides in the provision of a thermoelectric electromagnetic pump suitable for use in a power conversion system which functions both as a heat exchanger and as a pump for circulating a liquid metal coolant to effect heat extraction from a source of thermal energy.

Other objects and advantages of the present invention will become apparent from the following description of a preferred embodiment thereof when considered in conjunction with the accompanying drawings, wherein:

FIGURE 1 is a simplified perspective view illustrating a power conversion system of the type contemplated by the present invention;

FIGURE 2 is a fragmentary sectional view taken along the line 2—2 of FIGURE 1 illustrating a portion of a thermoelectric generator utilized in the power conversion system to effect a direct conversion of fission heat to electrical energy;

FIGURE 3 is a view taken along the line 3—3 of FIGURE 2;

FIGURE 4 is an enlarged fragmentary view illustrating integrated energy conversion and radiator sections of a portion of the thermoelectric generator shown in FIGURE 2;

FIGURE 5 is an enlarged perspective view of an integrated thermoelectric electromagnetic pump-heat exchanger of the type utilized in the power conversion system shown in FIGURE 1;

FIGURE 6 is a cross-sectional view taken along the line 6—6 in FIGURE 5;

FIGURE 7 is another cross-sectional view of the electromagnetic pump taken along the line 7—7 in FIGURE 5; and FIGURE 8 is a diagrammatic representation of the overall thermoelectric power conversion system, various features of which are illustrated in FIGURES 1-7.

In general, the conversion system contemplated by the present invention includes a first or primary closed, liquid metal coolant loop that functions to transport a heated liquid metal coolant from a heat source to and through an integral thermoelectric electromagnetic pump-heat exchanger. The electromagnetic pump-heat exchanger generates an internal direct current which is utilized to produce a thrust that initiates and maintains the circulation of the coolant in the primary loop. Heat from the coolant circulating in the primary loop is transmitted via the pump to a liquid metal coolant being circulated in a closed secondary coolant loop, a segment of which extends through the pump. The heated coolant being circulated in the secondary loop is directed through a thermoelectric generator or panel wherein heat derived from the coolant carried in the secondary loop is converted directly to electrical energy.

Referring in detail to the drawings, a heat source 10 such as a nuclear reactor or other source of thermal energy is suitably connected in one leg 11 of a closed primary liquid metal coolant loop 12. More particularly, an inlet conduit member 11a and an outlet conduit member 11b are secured in communication with the heat source 10 and are joined to similar metallic conduit members which form the primary liquid metal coolant loop 12. In a preferred embodiment of the invention, the metallic conduit members are fabricated of stainless steel that can with stand the high temperature and corrosive effects of the coolant being circulated therein, the coolant preferably being NaK.

A second leg 13 of the primary coolant loop, which is also formed of a plurality of stainless steel conduit members, includes a portion of an integrated thermoelectric electromagnetic pump-heat exchanger 14 that initiates and maintains the circulation of the liquid metal coolant through the heat source 10. The electromagnetic pump 14 (FIGURE 7) includes two parallel, spaced apart liquid metal coolant passages or ducts 16 and 17 that are also preferably fabricated of stainless steel. The pumping duct 16, which has an elongated hollow rectangular configuration, is secured at the opposite extremities thereof to a pair of converging connecting members 18 and 19 that are joined to inlet and outlet conduit members 21 and 22, respectively. The conduit members 21 and 22 serve to complete a closed path for the flow of the liquid metal coolant from the reactor 10, through the pump 14 and back to the reactor. Similarly, the rectangular pumping duct 17 is joined to a pair of liquid metal carrying conduit members 24 and 26 through a pair of converging connecting members or channels 27 and 28, all of which are also fabricated from a material such as stainless steel in one preferred embodiment of the invention. These members are included in and form one leg of a secondary coolant loop generally designated by the numeral 29.

The structural details of the thermoelectric electromagnetic pump-heat exchanger 14 are best illustrated in FIGURES 5–7. As shown, a pair of bar magnets 31 and 32 are mounted above and below the pumping ducts and are electrically insulated therefrom by layers of insulation 33 and 34, respectively. Various types of insulation can be used for this purpose, such as glass cloth. Each of the bar magnets 31 and 32 is proportioned with a length and width that are compatible with the dimensions of the pumping ducts 16 and 17. As illustrated, each of the magnets is secured to the inner surface of the upper and lower walls of a support housing 35 that functions to complete a magnetic circuit between the bar magnets. The housing is preferably fabricated from a grain oriented silicon steel characterized by high magnetic permeability. In this connection, the bar magnets are arranged so that the lower magent 31 acts as a north pole while the upper bar magnet 32 serves as a south pole and a magnetic field exists therebetween.

Interposed between and extending along the entire length and a portion of the width of the pumping ducts 16 and 17 is a layer 36 of electrical insulation such as glass cloth. The layer 36 acts as a thermal conductor while functioning as an electrical insulator. The purpose of the thermally conductive layer 36 is to permit the exchange of heat between the pumping ducts 16 and 17 and the liquid metal coolant medium being circulated through each of these ducts.

The remaining widthwise portions of the ducts 16 and 17 are separated by a single element 37 (forming the negative element of a thermocouple) which in a preferred embodiment of the invention is fabricated from an n type semiconductor material such as PbTe. As illustrated in FIGURE 6, the negative element 37 extends along the length of and is suitably secured in thermal and electrical contact with the ducts 16 and 17. Similarly, another element 38 (forming the positive element of a thermocouple) is secured in electrical and thermal contact with the edges of the ducts 16 and 17 and extends outwardly and away from the magnetic field existing between the bar magnets 31 and 32. The positive element 38 may be fabricated from a conductive material such as iron or from a p type semiconductor material such as ZnSb. The choice of the material for the element 38 will be dictated by the temperatures that will be experienced in a given application. Various methods may be utilized to join the conductive elements 37 and 38 to the pumping ducts 16 and 17. One preferable method of accomplishing this is similar to that disclosed and claimed in applicant's copending application, Serial No. 131,415 which was filed on August 14, 1961.

The lower duct which carries a heated metalized coolant from the nuclear reactor 10, acts as the hot junction for a thermocouple including the negative element 37 and the positive element 38. The pumping duct 17, which circulates the coolant through the secondary loop 29, acts as the cold junction for this thermocouple; the term thermocouple being used to designate a device for generating a thermal E.M.F. As a consequence, with each of the pumping ducts 16 and 17 carrying liquid metal coolants at different temperatures, an E.M.F. is generated across the hot and cold junctions of the elements 37 and 38, and a flow of direct current exists therebetween.

Referring still to FIGURE 6, it can be seen that when an E.M.F. is generated across the positive and negative elements 37 and 38, current will flow from right to left through the liquid metal medium contained in the lower pumping duct 16 and from left to right through the liquid metal medium in the upper pumping duct 17. Consequently, as long as a temperature differential exists across the junctions of the positive and negative elements, a circulating direct current will flow in a clockwise direction through the liquid metal coolant in the upper and lower pumping ducts. The direct current components passing through the upper and lower pumping ducts each constitute one of a pair of thrust-producing components that effect the pumping of the liquid metal coolant from the conduit member 21 to the conduit member 22, and from the conduit member 24 to the conduit member 26.

As previously set forth, the bar magnets 31 and 32 acting as north and south poles, respectively generate a magnetic field through the pumping sections of the ducts 16 and 17. This magnetic field, which constitutes the second thrust-producing component that effects the desired dual pumping action, is directed upwardly through the pumping segments 16 and 17 (i.e., from the bar magnet 31 to the bar magnet 32) and is perpendicular to the oppositely directed current components flowing in these pumping sections.

Considering the coaction of the magnetic field passing through the lower pumping section 16 with the direct current component flowing through the liquid metal coolant contained therein, it will be seen that these mutually perpendicular components impart a movement to the liquid metal medium and effect the pumping thereof through the duct and a circulation thereof through the primary coolant loop 12. Simultaneously, the coaction of the generated magnetic field with the current component flowing through the liquid metal contained in the upper pumping duct 17 imparts a pumping thrust thereto and a circulation thereof through the secondary coolant loop 29. Accordingly, a constant circulation of liquid metal is concomitantly maintained in the primary loop and the secondary loop due to the dual action of the thermoelectric electromagnetic pump 14. The liquid metal medium circulated through each of the pumping ducts 16 and 17 is analogous to a current carrying conductor disposed in a magnetic field which is moved relative thereto by the coaction of the field with the moving charges carried by the conductor.

While the dual pumping action is being effected, the pump permits the exchange of thermal energy between the hotter liquid metal medium entering the lower duct 16 and the cooler liquid medium entering the upper duct 17. More particularly, because the insulating layer 36 serves as a conductor of thermal energy, heat generated by the controlled fission process taking place in the reactor 10 will be transmitted to the cooler liquid metal medium circulated by the pump 14 through the duct 17 of the secondary loop 29. As a consequence of this exchange of thermal energy, the liquid metal being circulated from the reactor through the pump returns to the reactor at a substantially lower temperature. Similarly, a change in temperature of the coolant being circulated in the secondary loop is effected during passage through the pump 14. However, in this instance the circulated liquid metal medium experiences an increase in temperature due to the absorption of thermal energy which is transmitted thereto from the pumping duct 16 through the insulating layer 36.

The coolant flowing in the secondary loop 29, which experiences a temperature rise upon passing through the pump 14, is circulated by the pump to and through a thermoelectric generator or panel generally designated by the numeral 40. More particularly, the coolant is carried by the conduit member 26 to a header (not shown) provided at the inlet of the thermoelectric panel or generator. The header divides and directs the coolant flow to a plurality of aluminum channels or coolant tubes 41 which traverse the panel and are joined at the opposite extremity thereof by a second header (not shown) that collects the liquid metal coolant. The coolant is thereafter circulated through the conduit member 24 and again through the pump 14.

Various thermoelectric panel constructions are available for use with the system contemplated by the present invention. Various features of one such construction are illustrated in FIGURES 2-4. Referring to FIGURE 2, the thermoelectric panel 40 consists of a plurality of convertor sections generally designated by the numeral 42 and radiator sections generally designated by the numeral 43. The convertor sections 42 function to effect a direct conversion of fission heat to electrical energy. The radiator sections 43 complement this conversion of heat to electrical energy and serve to reject waste heat from the panel to the surrounding environment. In this connection, the radiator sections of the thermoelectric panel 40 function as the cold junction for a plurality of dual thermocouples that are electrically connected in a series-parallel arrangement and which constitute the convertor sections 42. The channels or tubes 41, which carry the heated liquid coolant circulated by the pump, serve as the hot junctions for these elements.

As shown in the drawings, the channels 41 which extend across the panel 40 are structurally arranged in parallel relationship to each other. The channels or coolant tubes are mounted within a plurality of cubical electrically conductive blocks 44 preferably fabricated of aluminum. The channels 41 are electrically insulated from the blocks 44 by layers 46 of thermally conductive insulation (i.e., Pyroceram) provided in the apertured control portions of the blocks 44 and secured in concentric relation about the sections of the channels mounted therein.

As will be hereinafter described in detail, each of the numerous dual thermocouples constituting the convertor sections 42 includes a pair of p type semiconductor elements that are maintained in thermal contact with one section of a channel 41 and a pair of n type semiconductor elements that are also maintained in thermal contact with one section of an adjacent channel. In addition, each thermocouple includes a portion of a radiator section 43 that serves as the cold junction for the dissimilar pairs of semiconductor elements.

Inasmuch as each of the dual thermocouples is identical, the following description will be directed to the structural arrangement of a single one of these thermocouples as clearly illustrated in FIGURE 4. As shown in this drawing, a first cubical mounting block 44 has one of a pair of cylindrical n type semiconductor elements 47 secured to one end of an electrically conductive strip or plate 48 that is mounted on the upper surface of the block. A second cylindrical n type semiconductor element 47 is secured to and extends downwardly from one end of a second conductive strip or plate 49 that is secured to the lower surface of the same cubical supporting block. The extremities of each of the cylindrical semiconductor elements 47 are secured to a portion of a pair of electrically conductive two layer plates 50, which constitute two of the radiator sections 43. Each of the two-layer plates 50 includes a layer 50a and a layer 50b. In a preferred embodiment of the invention, the layer 50a is formed of aluminum and is characterized by a coefficient of electrical conductivity which is substantially greater than that of the layer 50b which is formed of $TiO_2$ deposited on the aluminum layer 50a.

A pair of p type semiconductor elements 51 are secured in thermal contact with a second cubical mounting block 44 in a manner identical to the n type semiconductor elements 47. In particular, the upper and lower p type semiconductor elements are secured to the ends of the plates 48 and 49 respectively which are mounted on the upper and lower surfaces of the second cubical block 44. The extremities of the cylindrical semiconductor elements 51 are joined to portions of the same electrically conductive two layer plate 50. Accordingly, the n and p type semiconductor elements are not only maintained in electrical contact but are also joined to common radiator sections that serve as the cold junctions for the dual thermocouples including these elements.

From the foregoing it can be seen that sections of adjacent tubes 41, blocks 44, end sections of the plates 48 and 49, and sections of the upper and lower plates 50 form two thermocouples across which a temperature differential will exist when a heated coolant is circulated through the channels by the pump 14. The temperature differential existing between the plates 50, which are exposed to an environment external to the system, and the adjacent coolant carrying channels 41 result in the generation of an E.M.F. across the dual thermocouples that is proportional to this temperature differential.

To accomplish removal of the generated electrical energy, the individual thermocouples will be connected in a series-parallel relation by the electrically conductive plates 48 and 49 and two layer plate 50. As best illustrated in FIGURE 2, a series path for current flow between adjacent aligned dual thermocouples (i.e., in a direction transverse to the coolant flow through the channels 41) can be traced from a pair of n type semiconductor elements of a first dual thermocouple, through the highly conductive lower layer 50a of the two layer plate 50, the p type semiconductor elements 51 of the same thermocouple, the plates 48 and 49, and the n type semiconductor elements 47 of the adjacent dual thermocouple, etc. Since there are a plurality of rows including a number of these units, numerous parallel paths for current flow are provided across the width of the panel 40.

The coolant circulated through adjacent ducts 41, which form the hot junctions for the aforedescribed thermocouples, gives up a substantial amount of thermal energy as the coolant traverses the panel. In this connection, parallel paths for thermal energy from various sections along the channels 41 are provided through the ducting itself, the layer of insulation 46, blocks 44, end sections of the plates 48 and 49, the semiconductor elements 47 and 51, and the plates 50. The thermal energy conducted through these parallel heat paths is emitted from the layer 50b of the two layer plate to the external environment, and the coolant exiting from the panel 40 returns to the pump 14 at a lower temperature. Consequently, a maximum amount of heat is absorbed by the coolant during the recirculation thereof through the pumping duct 17 since it returns to the pump at a temperature substantially below the temperature of the coolant in the lower pumping duct 16.

The utility of the overall power conversion system and the component parts thereof which have been previously described in detail will best be understood from a consideration of the system as diagrammatically illustrated in FIGURE 8. The source of thermal energy utilized with the system, which is preferably a nuclear reactor, will operate effectively with coolant temperatures up to approximately 650° C. If the reactor is to operate under optimum conditions and if maximum heat extraction is to be effected, attempts should be made to utilize a low volume coolant flow with a substantial difference between the inlet and outlet temperatures. To establish and maintain these flow conditions and the desired temperature differential, the lower pumping duct 16 and the closed coolant loop 12 are made dimensionally smaller in cross-sectional area than the upper pumping duct 17 and the secondary closed coolant loop 29.

In one preferred embodiment of the invention, the coolant circulated within the primary coolant loop will enter the reactor at a temperature of approximately 365° C. and will have a volumetric flow rate of approximately 5 g.p.m. under the influence of a pressure head of 1 p.s.i. The resulting circulation of the coolant through the neutronic reactor core (not shown) will effect a substantial amount of heat extraction and the coolant exiting from the reactor will have a temperature of approximately 465° C. As the coolant emanating from the reactor is circulated through the lower primary duct 16, thermal energy will be transmitted therefrom through the layer of insulation 36. The heat given up by the coolant circulated in the primary loop will be absorbed by the coolant confined in the secondary coolant loop as it is circulated through the upper primary duct 17.

Since the thermoelectric generator 40, which includes the numerous dual thermocouple elements, will function most efficiently when a moderate temperature differential exists between the hot and cold junctions of the thermocouples, a high-volume coolant flow through this component of the system is desirable. This higher volume coolant flow through the generator is realized through the utilization of a dimensionally larger ducting system throughout the entire loop which communicates with the plurality of small coolant channels or ducts 41 extending across the panel 40.

In the preferred embodiment of the invention being described, coolant in the secondary loop will enter the pumping duct 22 with a temperature of approximately 300° C. and will exit from the duct at a temperature of approximately 350° C. after a heat exchange process has taken place therein. The volumetric flow rate of the coolant in the secondary loop will be approximately 10 g.p.m. under the influence of a pressure head of approximately .5 p.s.i. With the temperature of the coolant in the secondary loop at 350° C. as it enters the input feeder of the generator 40 (assuming a radiator section-cold junction temperature of approximately 200° C.) a substantial amount of waste heat will be dissipated from the radiator sections 43 as electrical energy is generated by the convertor section 42.

One specific set of representative parameters for a preferred embodiment of the power conversion system contemplated by the present invention is set forth in Table I. It should be understood that the data contained in this table is merely illustrative of certain of the features of the invention and should not be construed as limiting the invention to specific structural materials or operating conditions.

*Table I.—Performance data for thermoelectric system*

| System: | |
|---|---|
| Reactor thermal power (watts) | 20,800. |
| Electric power output (initial watts) | 584. |
| Voltage (initial) at maximum efficiency (volts) | 30. |
| Total weight (without reactor) (lbs.) | 68.7 |
| Generator: | |
| Heat input (watts) | 20,400. |
| Hot junction temperature (° C.) | 325. |
| Cold junction temperature (° C.) | 202. |
| P-leg material | ZnSb. |
| N-leg material | PbTe. |
| Number of couples | $9.65 \times 10^3$. |
| Heat transport medium | NaK. |
| Flow rate (g.p.m.) | 10. |
| Pressure drop (p.s.i.) | 0.05. |
| Temperature drop (inlet to outlet) (° C.) | 50. |
| Radiator: | |
| Total radiator surface (free space) (ft.$^2$) | 81.6 |
| Area of panel (ft.$^2$) | 40.8. |
| Side of square panel (ft.) | 6.4. |
| Pump: | |
| Type | D.C. Faraday (permanent magnet). |
| Capacity (g.p.m.): | |
| Hot loop | 5. |
| Cold loop | 10. |
| Pressure (p.s.i.): | |
| Hot loop | 1.0. |
| Cold loop | 0.50. |
| System weight (lbs.): | |
| Generator and radiator | 53.1. |
| Pump (including magnet) | 4.8. |
| Heaters, piping, coolant and voltage regulator | 10.8. |

Various changes and modifications may be made in the above described power conversion system without departing from the invention. For example, a differently constructed thermoelectric generator could be utilized in the system. In addition, modifications in the structural arrangement of the components of the system or in the materials from which they are fabricated could be effected which would fall within the spirit and scope of the present invention, various features of which are set forth in the accompanying claims.

What is claimed is:

1. A thermoelectric electromagnetic pump, which pump comprises a pair of ducts thermally coupled together but electrically insulated from each other, said ducts being adapted to carry liquid metal coolant, a pair of thermoelectric elements, one of p type material and the other of n type material, each of said elements being in thermal and electrical contact with the coolants in both of said ducts, the coolants being disposed between said elements, whereby temperature differential between said coolants generates a direct electric current through the liquid metal coolants from one thermoelectric element to the other, and means generating a magnetic field which passes through said coolants perpendicularly to said currents, whereby a force is generated which effects the circulation of the coolants through each of said ducts.

2. A thermoelectric electromagnetic pump, said pump comprising a first rectangular pumping duct of electrical and thermal conductive material for transporting a liquid metal coolant therethrough, a second rectangular pumping duct of electrical and thermal conductive material extending parallel to said first duct for transporting a liquid metal coolant therethrough, heat exchange means between said ducts for maintaining said first and second pumping ducts in thermal contact, and for electrically insulating said ducts, a pair of permanent magnets disposed on opposite outwardly facing sides of said thermally connected ducts, said magnets establishing a magnetic field through both of said pumping ducts substantially perpendicular to the direction of flow of liquid metal coolant therethrough, a pair of thermoelectric elements, one of p type material and the other of n type material, said elements being in thermal and electrical contact with both of said ducts, adjacent opposite sides thereof, thereby generating a direct electric current which passes through the liquid metal coolant in each of said pumping ducts, normal to the magnetic field, whereby pumping thrust is imparted to the coolant in each of said ducts.

3. A thermoelectric electromagnetic pump, said pump comprising a pair of parallel, spaced apart liquid metal coolant carrying ducts of electrical and thermal conductive material, each of said ducts having an elongated, hollow, rectangular configuration, a layer of electrically insulating, thermal conducting material interposed between said ducts, a pair of permanent bar magnets mounted on opposite, outwardly extending faces of said pair of ducts, so as to have oppositely disposed poles, a housing of ferromagnetic material encompassing said magnets and secured thereto so as to complete a magnetic circuit between said magnets, said magnets establishing a magnetic field through both of said ducts substantially perpendicular to the direction of flow of liquid metal coolant therethrough, a pair of thermoelectric elements, one of said thermoelectric elements being composed of n type material and being disposed between and in contact with said pair of ducts at one side of said pair of ducts, the other of said thermoelectric elements being of p type material and being disposed adjacent the opposite side of said pair of ducts and in contact therewith, whereby a direct electric current is generated which passes through the liquid metal coolant in each of said ducts normal to the magnetic field in said ducts, simultaneously imparting pumping thrust to the liquid metal coolant present in each of said ducts.

References Cited by the Examiner

UNITED STATES PATENTS

| | | |
|---|---|---|
| 2,748,710 | 6/1956 | Vandenberg. |
| 2,997,515 | 8/1961 | Sampietro _____ 136—4 |
| 3,048,113 | 8/1962 | Hilgert. |

FOREIGN PATENTS

| | | |
|---|---|---|
| 839,824 | 6/1960 | Great Britain. |

OTHER REFERENCES

Directory of Nuclear Reactors, vol. 1, Power Reactors, International Atomic Energy Agency (1959), pp. 188–189.

WINSTON A. DOUGLAS, *Primary Examiner.*

JOHN H. MACK, *Examiner.*

A. B. CURTIS, *Assistant Examiner.*